United States Patent [19]

Bianchi et al.

[11] Patent Number: 5,212,534

[45] Date of Patent: May 18, 1993

[54] DISTANCE-MEASURING METHOD AND TRANSMITTING AND RECEIVING STATION FOR CARRYING OUT THE SAME

[75] Inventors: Alessandro Bianchi, Albano Laziale; Guiseppe Comito, Pomezia; Andrea Fantini, Tivoli, all of Italy

[73] Assignee: Alcatel N.V., Amsterdam, Netherlands

[21] Appl. No.: 796,414

[22] Filed: Nov. 22, 1991

[30] Foreign Application Priority Data

Nov. 22, 1990 [IT] Italy ................................ 22157 A/90

[51] Int. Cl.$^5$ .............................................. H04J 1/00
[52] U.S. Cl. ........................................ 356/5; 359/110; 359/121
[58] Field of Search ...................... 359/110, 121; 356/5

[56] References Cited

U.S. PATENT DOCUMENTS 5,077,729 12/1991 Wong ................................ 359/110

Primary Examiner—Mark Hellner
Attorney, Agent, or Firm—Ware, Fressola, Van Der Sluys & Adolphson

[57] ABSTRACT

In an optical communication system with a passive star coupler, measurement between a station and a central node should not interfere with the operation of other stations. Distance measurement is accomplished by determining the echo delay using a wavelength not being used by other stations. The system uses combined wavelength- and time-division multiplexing. One wavelength is always kept free for measurements if possible. For the measurement, the same data format as that employed during normal operation can be used. Measurement can be continuously repeated unchanged during operation.

19 Claims, 2 Drawing Sheets

DISTANCE-MEASURING METHOD AND TRANSMITTING AND RECEIVING STATION FOR CARRYING OUT THE SAME

BACKGROUND OF THE INVENTION

The present invention relates to a method of measuring the distance from a station of a passive optical star network to the central node of the passive optical star network when the station is put into operation, and to a transmitting and receiving station suitable for carrying out the method.

The invention starts from a communication system having a plurality of transmitting and receiving stations which are interconnected by a passive optical star network. The transmitters of these stations transmit information to the central node of this star network, from where the transmitted information is distributed to the receivers of all stations. To avoid mutual interference, the stations are assigned individual time slots. The manner of this assignment does not form part of this invention, which, in turn, is independent of the manner of the assignment. What is important is that the assignment takes place in advance, even though only shortly before.

The network is to be operated at such a high transmission speed that the delay cannot be left unconsidered. The delay can be taken into account by corresponding guard time intervals between the transmission of the individual stations. It is desirable to keep the guard time intervals shorter than the delays. This can be achieved by allowing for the various delays. In an optical star network, the transmissions of the individual stations follow separate paths up to the central node, are united there, and then go as a complete frame to all stations involved. The frame is thus formed at the central node. To permit correct frame formation, each transmitting station must take into account the propagation time to the central node and transmit correspondingly earlier. This requires that this propagation time be known.

Measuring the lengths of the cables laid to the central node would in practice be unsatisfactory, and the measurement result could not be automatically adopted by the station connected or to be connected to the network.

Prior to system start-up, an echo measurement could be performed at the individual stations, and its result could be used direct. However, when a new station is added or a station is put into service again after an interruption, e.g., for a repair, that would not be possible without interfering with the operation of the other stations.

Disconnecting the measuring station from the central node is undesirable for practical reasons and, on the other hand, requires that only one station be connected to each ray of the star. However, neither the connection of two or more stations to one ray nor any branching of individual rays is to be excluded.

SUMMARY OF THE INVENTION

It is the object of the invention to perform distance measurements in an optical communication network with a passive star coupler without interfering with the operation of other stations.

This object can be attained by using a method of measuring the distance from a station of the passive optical star network to the central node of the passive optical star network when the station is put into operation, whereby a signal is transmitted on a wavelength not being used for message transmission, and the delay until the receipt of an echo signal is measured. The wavelength can be a wavelength not specified for message transmission or one of a plurality of wavelengths specified for message transmission. After the distance measurement has been performed, attempts can be made to change to a wavelength already being used by other stations. Oftentimes, the distance measurements are repeated during operation. Ideally, prior to the first distance measurement, a collision avoidance scheme is implemented to ensure that no other station is using the same wavelength.

Desirably, the signal transmitted for measuring the distance has a frame structure containing an identification of the station. The frame structure used during operation is used for the distance measurement and, for the distance measurement, a slot is selected in the frame structure which is also assigned to the station during operation; and The fundamental idea is to use for the distance measurement during station start-up a wavelength other than that or those on which the other stations are exchanging messages. This requires, besides the distance-measuring equipment itself, that it is possible to operate on another wavelength.

A preferred solution uses combined wavelength- and time-division multiplexing in which one wavelength (not necessarily always the same) is always kept free for measurements if possible. For the measurements, use can be made of the same data format as that employed during operation. This has the advantage that the distance measurement can be repeated during operation in order to take into account aging or temperature effects, whenever it is needed.

BRIEF DESCRIPTION OF THE DRAWINGS

An embodiment of the invention will now be explained with reference to the accompanying drawings, in which.

Figure 1:
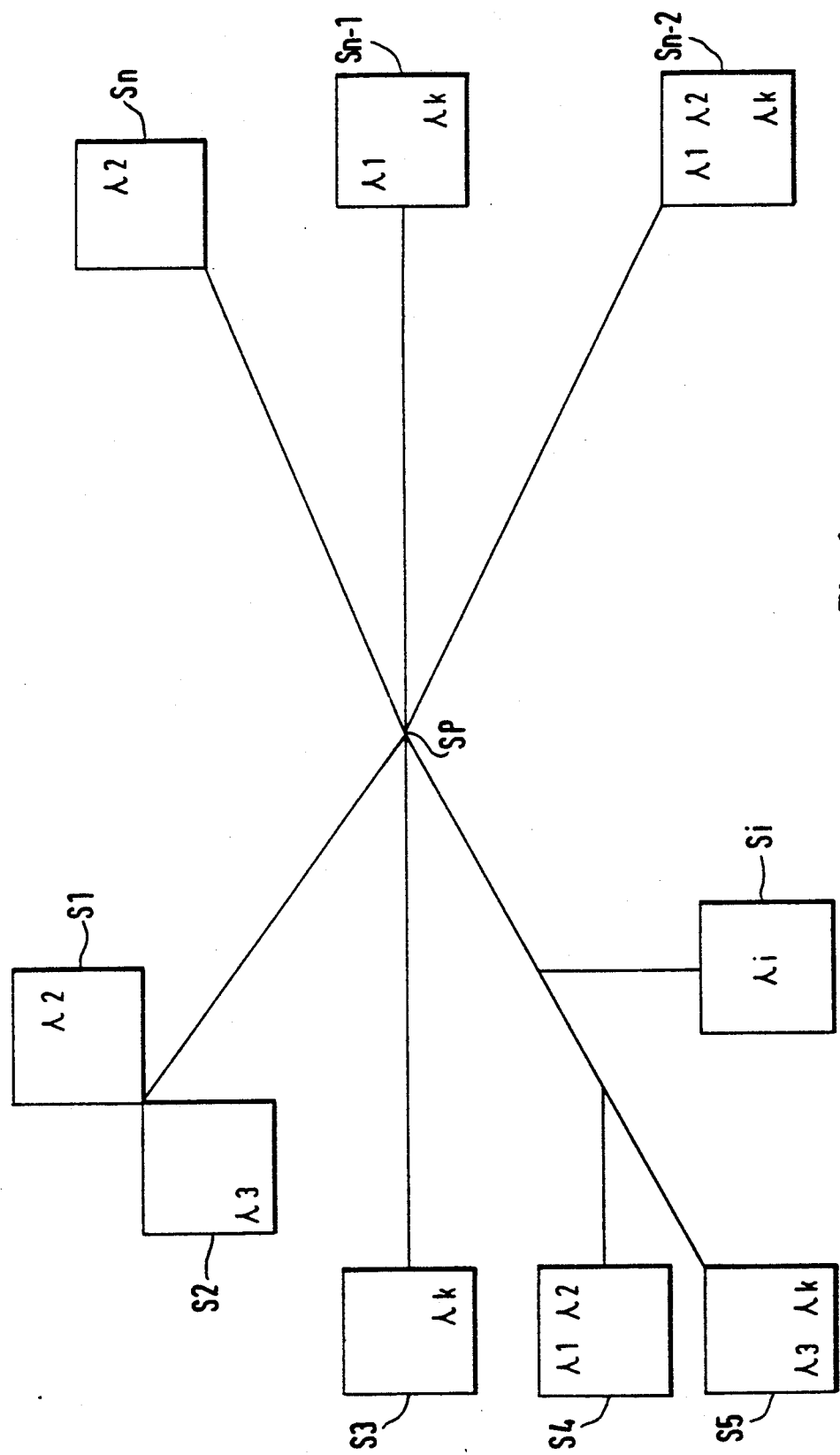
FIG. 1 shows schematically the structure of an optical communication network with a passive star coupler.

The optical communication network of FIG. 1 has a number of transmitting and receiving stations S1, ..., Si, ..., Sn. These are connected by optical waveguides to a central node SP and, thus, also with one another. The use of the present invention is not excluded if more than one station is located at an end of an optical-waveguide link remote from the central node SP, i.e., at the end of a ray. In the example of FIG. 1, that applies to the stations S1 and S2. The use of the invention is not excluded, either, if one (or more) of the rays branches to two or more stations, as is the case for the stations S4, S5, and Si.

Separate optical waveguides are preferably used from the stations S1, ..., Si, ..., Sn to the central node (transmit direction) and from the central node to the stations (receive direction). In that case, steps must be taken at the central node to ensure that the light received from an optical waveguide is evenly or at least approximately evenly distributed to all optical waveguides diverging from the central node.

In principle, it is also possible to use a network configuration with only one optical waveguide per ray provided that in the stations, the transmit and receive directions are separable, and that at the node, all incoming light is evenly reflected back into all optical waveguides.

Different operating wavelengths $\lambda 1 \ldots, \lambda i, \ldots, \lambda k$ are used in the network. Each of the stations $S1, \ldots, Si, \ldots, Sn$ can communicate with any other station on any of these operating wavelengths. The operation of individual stations on two or more wavelengths at a time is not excluded. In both directions, a given connection, i.e., between the stations S1 and S4, will use the same wavelength. Each station therefore receives all the information it has transmitted. This, however, could be ensured with different wavelengths.

In the example shown in FIG. 1, the wavelengths $\lambda 1$, $\lambda 2$, $\lambda 3$, and $\lambda k$ are being used for message transmissions between different stations.

Let us assume that the station Si of FIG. 1 is to measure its distance to the central node SP without being able to evaluate any earlier measurement results. To that end, an echo distance measurement is performed on the wavelength $\lambda i$ which is not being used for message transmission by any other station, i.e., a signal is transmitted and the delay until the occurrence of the echo is measured. Conversion from delay to distance and back would be readily possible but is not necessary here.

The present invention allows a station to be put into operation without interfering with the operation of other stations only if a wavelength on which this station can operate is currently free from message transmissions of each other of the stations. The station must therefore be able to operate on any one of at least two wavelengths. One of these wavelengths, however, must be kept free from message transmissions if possible.

In the present example, it is assumed that each station can operate on any one of the above operating wavelengths. Any one of these wavelengths can also be used for the distance measurement. When the distance measurement has been made, the station is ready for correct operation in the network. However, attempts should be made to ensure that at least one wavelength remains free or will become free again to allow further stations to be put into operation. One way to accomplish this could be to change to a wavelength already being used by other stations to increase the probability that there is always one free wavelength. A possibility that suggests itself is to change to that wavelength or to one of those wavelengths on which the station with which communication is to be established is already operating.

It is also possible, however, to provide a wavelength which may be used exclusively for distance measurements and other functions of this kind (service channel, network management), not for message transmission. All stations must then be switchable to this wavelength. Even if a free wavelength is used for distance measurements, a collision avoidance scheme should be implemented prior to the first distance measurement in order to ensure that no other station is using the same wavelength. Collision avoidance schemes are familiar to those skilled in the art. As a rule, the prerequisites for implementing a collision avoidance scheme must be present at each station for other reasons.

One of these prerequisites is that the station must be able to distinguish the echo of its own transmission from a transmission of another station. Preferably, a periodic digital signal containing an identification of the station is used for this purpose. If the received signal is garbled or the identification of another station is being received, this is an indication that a second station is trying to occupy this wavelength, too. In that case, the attempt will be repeated later or on another wavelength that appears free.

For the distance measurement, too, use is preferably made of a periodic digital signal, i.e., a signal with a frame structure, which contains an identification of the station. Both the signal for implementing the collision avoidance scheme and a signal with the frame structure to be used during operation are suitable for this purpose. These signals may be identical anyhow.

If the frame structure used during operation is also used for distance measurements, a time slot will preferably be selected therefrom which is also assigned to this station during operation. This also has the advantage that distance measurements can be performed even during operation and, thus, monitor the previously measured values, so that changes due to aging or temperature variations or different propagation conditions on the different wavelengths can be determined and compensated for.

If the frame structures used for the collision avoidance scheme and for normal operation differ, it is advantageous if both can be used for distance measurements.

Figure 2:
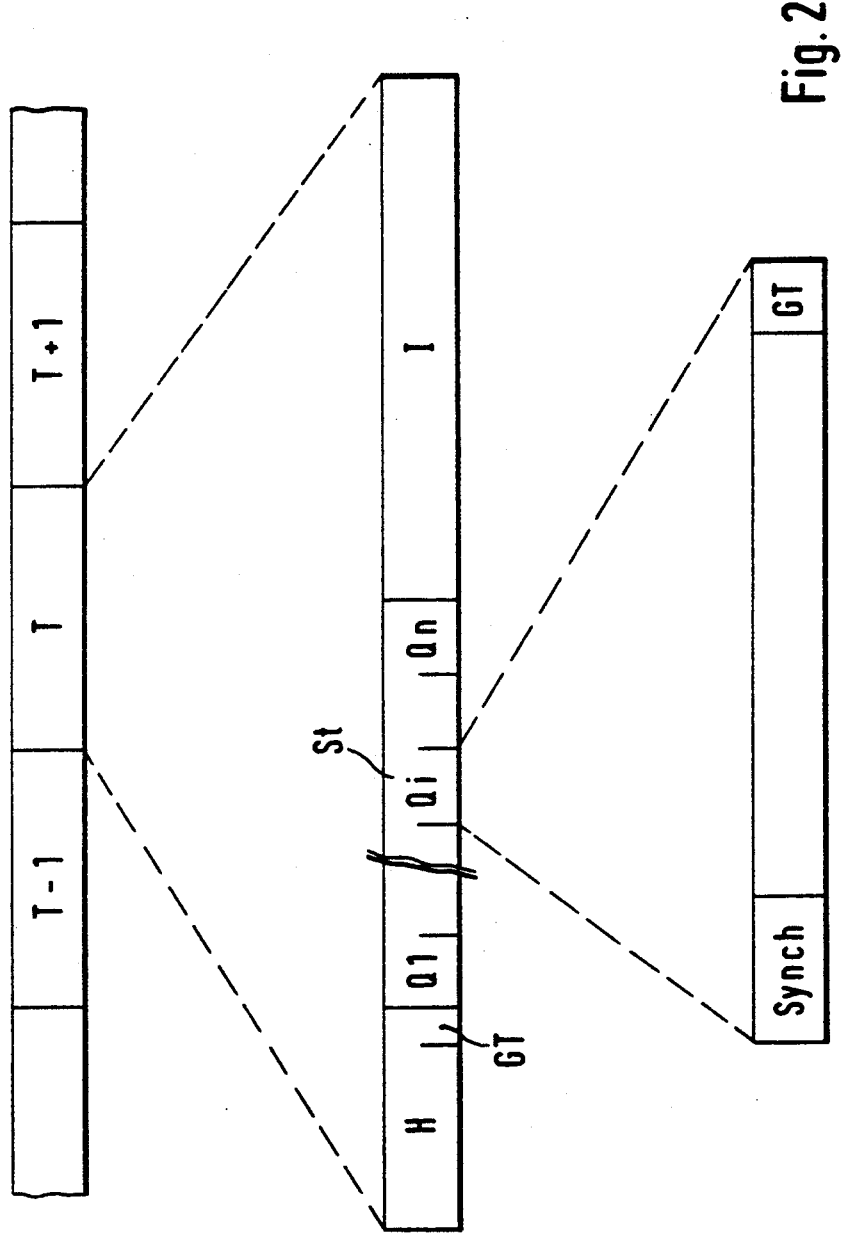
FIG. 2 shows a frame structure usable for message transmission and for measuring distances in the communication network of FIG. 1 in accordance with the invention.

FIG. 2 shows a frame structure usable for normal operation. The upper line shows a signal with three successive frames, $T-1$, $T$, and $T+1$. The structure of a frame is illustrated in the middle line. The frame has a header H, a status part St, and an information part I. During operation, a station transmits the header H, and in the status part St, a time slot $Q1, \ldots, Qi, \ldots, Qn$ is permanently assigned to each station. The information part I is continuously redistributed to the stations. The station Si which is to perform a distance measurement is assigned the time slot Qi, which is shown in greater detail in the lower line. What is important in this connection is that this time slot begins with a synchronizing part Synch. Also shown are the guard time intervals GT at the end of the transmission of each station.

In this embodiment, the identification of the station Si is the distance between the header H and the associated time slot Qi.

For the distance measurement, the time from the transmission of the synchronizing part Synch to its reappearance is measured. Devices for determining the exact time of occurrence of a synchronizing part must be present in any case.

A transmitting and receiving station suitable for carrying out the method according to the invention requires an optical transmitter and an optical receiver which must both be switchable between at least two operating wavelengths, i.e., between at least two wavelength ranges. Whether the switching is effected by tuning one and the same functional unit in a suitable manner or by switching between two like functional units differing in their operating wavelengths is irrelevant. Such a station must further include a comparing device which supplies an indication of agreement or disagreement between data received by the receiver and data previously transmitted by the transmitter. Digital comparing devices are generally known. Furthermore, a measuring device must be present which measures the delay from the transmission of data to the reception of matching data, i.e., to the response of the comparing device. It is sufficient if the comparing device and the measuring device operate only if a particular data word, e.g., a synchronizing word, is used.

If a preferred embodiment, the transmitting and receiving station includes a frame generator, and its transmitter can transmit a frame generated by the frame generator. To this end, at least one frame header, in the example the header H, must be periodically transmitted. Advantageously, however, a station identification character is additionally transmitted and detected by the comparing device. This may be, for example, a number contained in the header which specifies the station currently transmitting the header. Such devices are familiar to those skilled in the art.

What is claimed is:

1. Method of measuring the distance from a station of a passive optical star network to a central node of said passive optical star network when said station is put into operation, comprising the steps of:
    transmitting a signal on a wavelength not being used for message transmission; and
    measuring delay until receipt of an echo signal, whereby the delay corresponds to a distance measurement.

2. A method as claimed in claim 1, wherein the wavelength used is a wavelength not specified for message transmission.

3. A method as claimed in claim 1, wherein the wavelength used is one of a plurality of wavelengths specified for message transmission.

4. A method as claimed in claim 3, further comprising the step of attempting to change to a wavelength already being used by other stations after the distance measurement is performed.

5. A method as claimed in claim 1, wherein the signal transmitted for measuring the distance has a frame structure containing an identification of the station.

6. A method as claimed in claim 1, wherein the signal transmitted for measuring the distance has a frame structure containing a slot which is assigned to the station during operation.

7. A method as claimed in claim 6, further comprising the step of repeating the distance measurement during operation.

8. A method as claimed in claim 1, further comprising the step of implementing a collision avoidance scheme to ensure that no other station is using the same wavelength prior to the signal transmitting step.

9. An apparatus for measuring the distance from a station of a passive optical star network to a central node of said passive optical star network when said station is put into operation, comprising:
    means for transmitting on a wavelength not being used for message transmission; and
    means for measuring delay until receipt of an echo signal, whereby the delay corresponds to a distance measurement.

10. An apparatus as claimed in claim 9, wherein the wavelength used is a wavelength not specified for message transmission.

11. An apparatus as claimed in claim 9, wherein the wavelength used is one of a plurality of wavelengths specified for message transmission.

12. An apparatus as claimed in claim 11, further comprising means for attempting to change to a wavelength already being used by other stations after the distance measurement has been performed.

13. An apparatus as claimed in claim 9, wherein the signal transmitted for measuring the distance has a frame structure containing an identification of the station.

14. An apparatus as claimed in claim 9, wherein the signal transmitted for measuring the distance has a frame structure containing a slot which is assigned to said station during operation.

15. An apparatus as claimed in claim 14, further comprising means to repeat the distance measurement during operation.

16. An apparatus as claimed in claim 9, further comprising means to implement a collision avoidance scheme prior to sending the signal for the distance measurement.

17. Transmitting and receiving station for a passive optical star network, comprising:
    an optical transmitter for transmitting messages in a first wavelength; and
    an optical receiver for receiving messages in said first wavelength,
    wherein the transmitter and the receiver are switchable to a second wavelength range, the station includes a comparing device which supplies a comparison between data received by the receiver and data previously transmitted by the transmitter, and the station includes a measuring device for measuring delay from the transmission of data to the reception of data matching the transmitted data.

18. A station as claimed in claim 17, further including a frame generator, and the transmitter is capable of transmitting a frame generated by the frame generator.

19. A station as claimed in claim 18, characterized in that the comparing device detects the occurrence of an own-station identification character contained in the frame.

* * * * *